(12) United States Patent
Herbolzheimer et al.

(10) Patent No.: US 10,471,807 B2
(45) Date of Patent: Nov. 12, 2019

(54) COOLANT CIRCUIT, IN PARTICULAR A HEAT PUMP CIRCUIT

(71) Applicant: Bayerische Motoren Werke Aktiengesellschaft, Munich (DE)

(72) Inventors: Robert Herbolzheimer, Groebenzell (DE); Robert Mager, Paehl (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 18 days.

(21) Appl. No.: 15/284,589

(22) Filed: Oct. 4, 2016

(65) Prior Publication Data

US 2017/0021699 A1 Jan. 26, 2017

Related U.S. Application Data

(63) Continuation of application No. PCT/EP2015/064231, filed on Jun. 24, 2015.

(30) Foreign Application Priority Data

Jul. 7, 2014 (DE) .................. 10 2014 213 092

(51) Int. Cl.
*B60H 1/03* (2006.01)
*B60H 1/32* (2006.01)
(Continued)

(52) U.S. Cl.
CPC ......... *B60H 1/323* (2013.01); *B60H 1/00921* (2013.01); *B60H 1/22* (2013.01);
(Continued)

(58) Field of Classification Search
CPC . F25B 2313/0234; B60H 1/22; B60H 1/3229; B60H 2001/3288
(Continued)

(56) References Cited

U.S. PATENT DOCUMENTS 5,215,044 A * 6/1993 Banzhaf .................. F01P 3/20
123/41.05
5,309,731 A 5/1994 Nonoyama et al.
(Continued)

FOREIGN PATENT DOCUMENTS

CN 101428544 A 5/2009
CN 103121393 A * 5/2013
(Continued)

OTHER PUBLICATIONS

WO 2013094144 A1 translation.*
(Continued)

*Primary Examiner* — Christopher R Zerphey
*Assistant Examiner* — Paul S Schwarzenberg
(74) *Attorney, Agent, or Firm* — Crowell & Moring LLP

(57) ABSTRACT

A heat pump circuit has the following components when seen in the flow direction: a compressor; a condenser or gas cooler; a first coolant/air heat exchanger as a sub-cooler, via which the coolant dispenses heat; a first expansion element; a first coolant/air heat exchanger, via which the coolant absorbs heat from the ambient air; a second expansion element; and a third coolant/air heat exchanger, via which the coolant absorbs heat from the ambient air. The arrangement of the heat exchanger is in front of the drive engine relative to the travel direction. The danger of the ambient heat exchanger freezing is minimized. With this arrangement.

13 Claims, 1 Drawing Sheet

(51) Int. Cl.
*B60H 1/00* (2006.01)
*F25B 5/04* (2006.01)
*F25B 40/02* (2006.01)
*B60H 1/22* (2006.01)

(52) U.S. Cl.
CPC ......... *B60H 1/3227* (2013.01); *B60H 1/3229* (2013.01); *F25B 5/04* (2013.01); *F25B 40/02* (2013.01); *B60H 2001/00949* (2013.01); *B60H 2001/00961* (2019.05); *B60H 2001/3288* (2013.01); *F25B 2341/0662* (2013.01); *F25B 2400/05* (2013.01)

(58) Field of Classification Search
USPC .......................................................... 62/244
See application file for complete search history.

(56) References Cited

U.S. PATENT DOCUMENTS

| | | | |
|---|---|---|---|
| 2011/0067427 A1* | 3/2011 | Haller | .................... B60H 1/005 62/324.6 |
| 2014/0298838 A1 | 10/2014 | Morishita et al. | |

FOREIGN PATENT DOCUMENTS

| | | | | |
|---|---|---|---|---|
| JP | 2004-182110 A | 7/2004 | | |
| JP | 2010-111222 A | 5/2010 | | |
| JP | 2010111222 A | * | 5/2010 | |
| JP | WO 2013094144 A1 | * | 6/2013 | ............. B60H 1/321 |
| JP | WO 2013136148 A1 | * | 9/2013 | ......... B60H 1/00278 |
| WO | WO 2013/094144 A1 | | 6/2013 | |
| WO | WO 2013094144 A1 | * | 6/2013 | ............. B60H 1/321 |

OTHER PUBLICATIONS

JP2010111222A translation.*
CN 103121393A translation.*
Chinese-language Office Action issued in counterpart Chinese Application No. 201580016165.0 dated Nov. 3, 2017 with English translation (14 pages).
International Search Report (PCT/ISA/210) issued in PCT Application No. PCT/EP2015/064231 dated Sep. 23, 2015 with English translation (six pages).
German-language Written Opinion (PCT/ISA/237) issued in PCT Application No. PCT/EP2015/064231 dated Sep. 23, 2015 (five pages).
German Search Report issued in counterpart German Application No. 10 2014 213 092.1 dated Jan. 19, 2015 with partial English translation (10 pages).
Chinese-language Office Action issued in counterpart Chinese Application No. 201580016165.0 dated Jul. 9, 2018 with English translation (13 pages).
Chinese-language Office Action issued in counterpart Chinese Application No. 201580016165.0 dated Jan. 9, 2019 with English translation (12 pages).

* cited by examiner

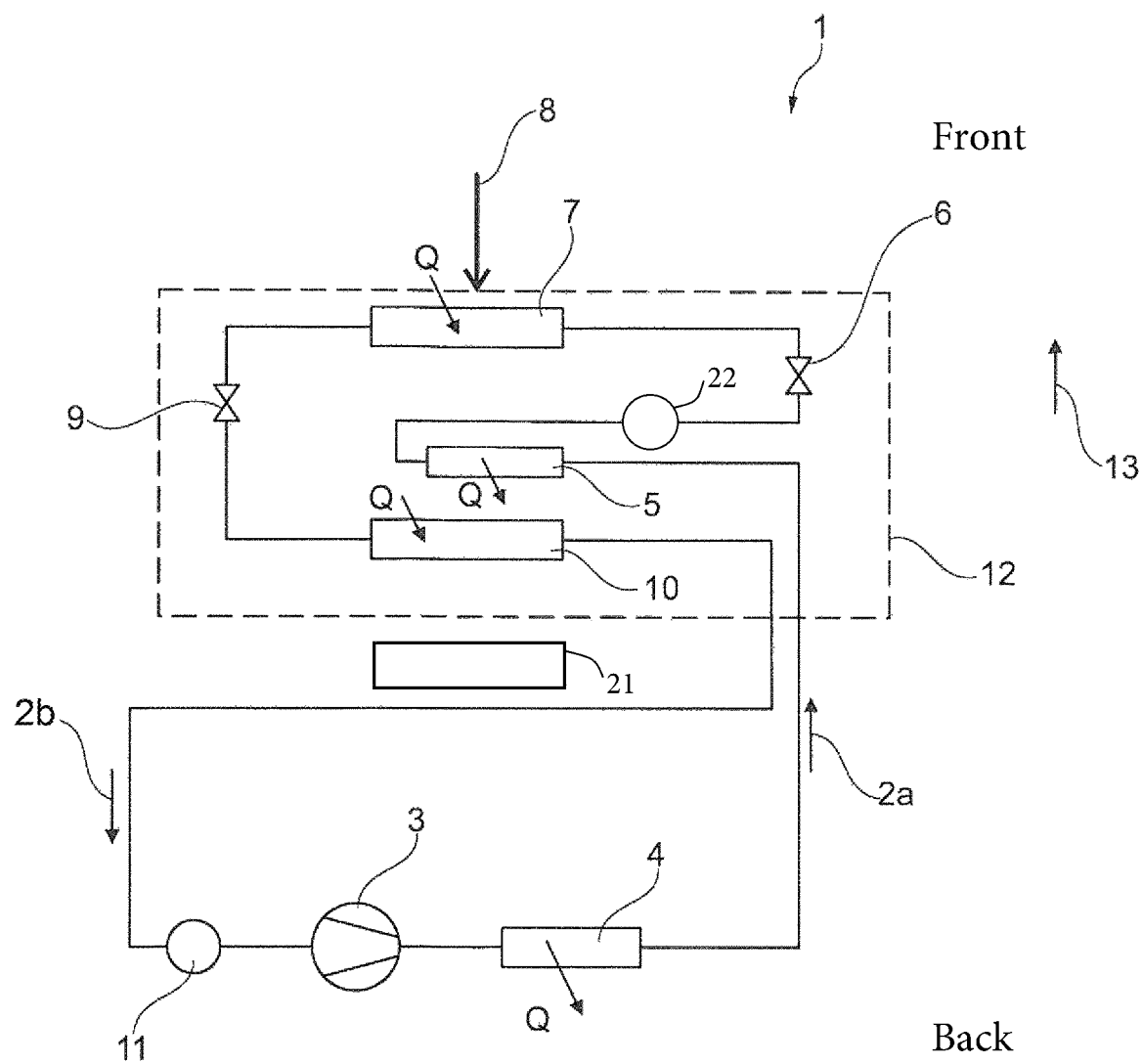

COOLANT CIRCUIT, IN PARTICULAR A HEAT PUMP CIRCUIT

CROSS REFERENCE TO RELATED APPLICATIONS

This application is a continuation of PCT International Application No. PCT/EP2015/064231, filed Jun. 24, 2015, which claims priority under 35 U.S.C. § 119 from German Patent Application No. 10 2014 213 092.1, filed Jul. 7, 2014, the entire disclosures of which are herein expressly incorporated by reference.

BACKGROUND AND SUMMARY OF THE INVENTION

The present invention relates to a refrigerant circuit, in particular a heat pump circuit, having dual-stage evaporation.

In heat pump circuits which are used in vehicles, the risk of freezing of the "ambient heat exchanger" or evaporator is a central problem. Freezing of the ambient heat exchanger is intended to be prevented since otherwise the power of the heat pump would significantly decrease.

An object of the invention is to provide a refrigerant circuit or heat pump circuit which is suitable for use in a vehicle and in which the risk of freezing of the ambient heat exchanger(s) of the refrigerant circuit is minimized.

This and other objects are achieved by a refrigerant circuit for vehicles, in particular a heat pump circuit for vehicles, which, when viewed in the flow direction of the refrigerant, has the following components:

a refrigerant compressor, a condenser or gas cooler, a first refrigerant/air heat exchanger which acts as a sub-cooler and via which the refrigerant discharges heat to the ambient air, a first expansion member, a second refrigerant/air heat exchanger via which the refrigerant absorbs heat from the ambient air, a second expansion member, and a third refrigerant/air heat exchanger via which the refrigerant heat absorbs heat from the ambient air.

A central aspect of the invention involves the third refrigerant/air heat exchanger, which is particularly susceptible to freezing and via which the refrigerant is intended to absorb heat from the environment, being arranged with respect to the first refrigerant/air heat exchanger in such a manner that it is thereby protected from freezing. To this end, the first refrigerant/air heat exchanger is arranged in such a manner that heated air which is discharged by the first refrigerant/air heat exchanger (sub-cooler) flows against, through or around the third refrigerant/air heat exchanger which is at risk of freezing.

According to an aspect of the invention, the refrigerant circuit is arranged in a vehicle. When viewed in the travel direction of the vehicle, the first refrigerant/air heat exchanger (sub-cooler) is arranged upstream of the third refrigerant/air heat exchanger which is particularly at risk of freezing. In other words, the third refrigerant/air heat exchanger which is particularly at risk of freezing is arranged downstream with respect to the flow direction of the ambient air (travel wind), that is to say, with respect to the first refrigerant/air heat exchanger, whereby, as already mentioned above, it is possible for the air or travel wind which is discharged by the first refrigerant/air heat exchanger to flow against or through the third refrigerant/air heat exchanger.

According to an aspect of the invention, the second refrigerant/air heat exchanger is arranged upstream of the first refrigerant/air heat exchanger (sub-cooler) when viewed in the travel direction of the vehicle.

The three refrigerant/air heat exchangers are thus arranged in a row one behind the other in the flow direction of the air or the travel wind.

In particular, there may be provision for the first refrigerant/air heat exchanger (sub-cooler) and the second refrigerant/air heat exchanger and the third refrigerant/air heat exchanger to be arranged, when viewed in the travel direction of the vehicle, in front of a drive motor, in particular in front of an internal combustion engine in the engine compartment of the vehicle.

The first and/or second expansion member may be purely mechanically controlled, thermostatic expansion members which are very cost-effective. Such purely mechanically controlled, thermostatic expansion members control "independently", that is to say, do not require any electronic control system or the like.

Alternatively, the first and/or the second expansion member could naturally also be constructed as an electrically controlled or regulated expansion member.

The condenser or gas cooler may be a refrigerant/air heat exchanger, that is to say, a heat exchanger via which the compressed refrigerant discharges heat to the ambient air.

Alternatively, the condenser or gas cooler could also be a refrigerant/fluid heat exchanger via which the refrigerant discharges heat, for example, to a coolant circuit of the vehicle, in particular to a coolant circuit of the internal combustion engine.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 is a schematic illustration of a refrigerant circuit according to the invention.

DETAILED DESCRIPTION OF THE DRAWING

FIG. 1 shows a refrigerant circuit 1 which, when viewed in the flow direction of the refrigerant (indicated by arrows 2a, 2b), has a refrigerant compressor 3 and a condenser or gas cooler 4. The condenser or gas cooler 4 may be a refrigerant/air heat exchanger, that is to say, a heat exchanger via which the compressed and heated refrigerant discharges heat to air for heating (for example, the passenger compartment).

Alternatively, the condenser or gas cooler 4 may also be a refrigerant/fluid heat exchanger via which the compressed and heated refrigerant discharges heat to a fluid circuit of a vehicle.

The compressed refrigerant heated in the condenser or gas cooler 4 flows through a first refrigerant/air heat exchanger 5 which acts as a sub-cooler. In the first refrigerant/air heat exchanger 5, the refrigerant discharges heat to the air flowing through or around the first refrigerant/air heat exchanger 5. The refrigerant is thereby further cooled. The pressure of the refrigerant originating from the first refrigerant/air heat exchanger 5 is then reduced in a first expansion member 6 to a saturation vapor pressure which substantially corresponds to the dew point temperature of the air or which substantially corresponds to a temperature of 1, 2, 3, 4, 5, 6, 7, 8, 9 or 10K above the dew point temperature of the air.

After the pressure reduction in the first expansion member 6, in a second refrigerant/air heat exchanger 7 there is carried out a heat absorption from the ambient air or the travel wind 8 (non-critical heat absorption).

After flowing through the second refrigerant/air heat exchanger 7, which acts as a first evaporator, the refrigerant further has its pressure reduced by way of a second expansion member 9 and subsequently flows through a third refrigerant/air heat exchanger 10 in which the refrigerant absorbs heat from the ambient air or the travel wind. From the third refrigerant/air heat exchanger 10, the refrigerant flows via a collector (low-pressure collector) 11 back to the intake side of the refrigerant compressor 3.

Alternatively or additionally to the collector 11, a (high-pressure) collector 22 may be arranged downstream of the first refrigerant/air heat exchanger 5.

As already mentioned, the refrigerant circuit 1 shown in FIG. 1 may be installed in a vehicle. The arrangement 12 formed by the first, second and third refrigerant/air heat exchanger may be arranged in front of a drive motor 21 (for example, an internal combustion engine) of the vehicle.

As can be seen in FIG. 1, when viewed in the travel direction 13 of the vehicle, the first refrigerant/air heat exchanger (sub-cooler) 5 is arranged in front of the third refrigerant/air heat exchanger 10. It is thereby possible for air discharged by the first refrigerant/air heat exchanger (sub-cooler) 5 to flow against or through the third refrigerant/air heat exchanger 10. The air discharged by the first refrigerant/air heat exchanger (sub-cooler) 5 is relatively warm and thus prevents freezing of the third refrigerant/air heat exchanger 10.

As can be seen in FIG. 1, the second refrigerant/air heat exchanger 7 when viewed in the travel direction 13 of the vehicle may be arranged in from of the first refrigerant/air heat exchanger 5. The second refrigerant/air heat exchanger 7 draws a given quantity of heat from the air or travel wind which passes through it. The cooled air originating from the second refrigerant/air heat exchanger 7 subsequently flows through the first refrigerant/air heat exchanger 5. Since this air is cooled, it can effectively absorb heat from the first refrigerant/air heat exchanger (sub-cooler) 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A refrigerant circuit, comprising:
   a compressor;
   a condenser or gas cooler;
   a first heat exchanger via which refrigerant discharges heat;
   a first expansion member;
   a second heat exchanger via which the refrigerant absorbs heat from ambient air;
   a second expansion member; and
   a third heat exchanger via which the refrigerant absorbs heat from the ambient air, wherein
   the refrigerant in the refrigerant circuit flows in the following order forming a single cooling loop for the refrigerant: the compressor, the condenser or gas cooler, the first heat exchanger, the first expansion member, the second heat exchanger, the second expansion member, and the third heat exchanger,
   the first heat exchanger is arranged such that heated air which is discharged by the first heat exchanger flows against, through or around the third heat exchanger,
   the refrigerant circuit is arranged in a vehicle, and
   when viewed from a front of the vehicle towards a back of the vehicle, the second heat exchanger is arranged in front of the first heat exchanger which is arranged in front of the third heat exchanger, such that the second, first, and third heat exchangers are arranged in a row one behind another.

2. The refrigerant circuit as claimed in claim 1, wherein the refrigerant circuit is arranged in a vehicle, wherein, when viewed from a front of the vehicle towards a back of the vehicle, the first heat exchanger is arranged in front of the third heat exchanger.

3. The refrigerant circuit as claimed in claim 2, wherein the second heat exchanger is arranged in front of the first heat exchanger when viewed from the front of the vehicle towards the back of the vehicle.

4. The refrigerant circuit as claimed in claim 1, wherein the refrigerant circuit is arranged in a vehicle, and
   the first heat exchanger, the second heat exchanger and the third heat exchanger are arranged, when viewed from a front of the vehicle towards a back of the vehicle, in front of a drive motor of the vehicle.

5. The refrigerant circuit as claimed in claim 4, wherein the drive motor is an internal combustion engine.

6. The refrigerant circuit as claimed in claim 1, wherein the first and/or second expansion member is a mechanical thermostatic expansion member that is operable without being electrically controlled.

7. The refrigerant circuit as claimed in claim 1, wherein the first and/or the second expansion member is an expansion member that is electrically controlled.

8. The refrigerant circuit as claimed in claim 1, further comprising:
   an accumulator arranged between the third heat exchanger and the compressor.

9. The refrigerant circuit as claimed in claim 8, further comprising:
   a second accumulator, in addition to the accumulator, arranged downstream of the first heat exchanger.

10. The refrigerant circuit as claimed in claim 1, further comprising:
    an accumulator arranged downstream of the first heat exchanger.

11. The refrigerant circuit as claimed in claim 1, wherein the condenser or gas cooler is a heat exchanger that performs heat exchange between refrigerant and air.

12. The refrigerant circuit as claimed in claim 1, wherein the condenser or gas cooler is a heat exchanger that performs heat exchange between refrigerant and coolant.

13. The refrigerant circuit as claimed in claim 1, wherein the refrigerant circuit is a heat pump circuit.

* * * * *